(12) United States Patent
Minami

(10) Patent No.: US 6,527,025 B1
(45) Date of Patent: Mar. 4, 2003

(54) TUBELESS TIRE

(75) Inventor: Nobuaki Minami, Shirakawa (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 0 days.

(21) Appl. No.: 09/392,573

(22) Filed: Sep. 9, 1999

(30) Foreign Application Priority Data

| Sep. 11, 1998 | (JP) | 10-258675 |
| Sep. 22, 1998 | (JP) | 10-267761 |
| Dec. 15, 1998 | (JP) | 10-356504 |
| Dec. 15, 1998 | (JP) | 10-356506 |
| Mar. 23, 1999 | (JP) | 11-078309 |

(51) Int. Cl.⁷ ............... B60C 9/00; B60C 15/06; B60C 15/00; B60C 61/00; B60C 09/02
(52) U.S. Cl. ............... 152/555; 152/527; 152/539; 152/541; 152/546; 152/552; 152/554; 152/564
(58) Field of Search ............... 152/454, 554, 152/555, 527, 542, 558, 548, 539, 540–543, 526, 546, 564

(56) References Cited

U.S. PATENT DOCUMENTS

| 3,692,080 A | * | 9/1972 | Boileau | 152/359 |
| 5,332,017 A | * | 7/1994 | Imamiya | 152/527 |
| 5,431,209 A | * | 7/1995 | Kajiwara | 152/454 |
| 5,479,977 A | * | 1/1996 | Tamano | 152/542 |
| 5,529,107 A | * | 6/1996 | Iwamura | 152/542 |
| 5,688,343 A | * | 11/1997 | Minami | 152/510 |
| 5,711,829 A | * | 1/1998 | Pollard | 152/209 |
| 5,820,711 A | * | 10/1998 | Sakmoto | 152/549 |

FOREIGN PATENT DOCUMENTS

| EP | 0705717 | 4/1996 |
| JP | 04208609 | * 11/1990 |
| JP | 403213408 | * 9/1991 |
| JP | 04063705 | * 2/1992 |
| JP | 6156007 | 3/1994 |

* cited by examiner

Primary Examiner—Michael W. Ball
Assistant Examiner—Justin Fischer
(74) Attorney, Agent, or Firm—Birch, Stewart, Kolasch & Birch, LLP

(57) ABSTRACT

A pneumatic tire comprises: a carcass ply extending between bead portions and including a topping rubber layer, the topping rubber layer facing the inside of the tire and made of a butyl rubber compound containing at least 10 parts by weight of butyl rubber or butyl rubber derivative; and a belt disposed radially outside the carcass in the tread portion, the belt comprising at least one ply of monofilament cords laid at an angle of from 10 to 40 degrees with respect to the circumferential direction of the tire, and each of the monofilament cord consisting of a single filament. The belt further comprises one ply of multifilament cords or one ply of monofilament cords. The height of a bead apex, which is disposed between a carcass ply turnup portion and main portion in each bead portion, can be reduced into a range of from 10 to 20 mm, and in this case, the carcass ply turnup portion is extended radially outwardly beyond the radially outer end of the bead apex so as to adjoin the carcass ply main portion.

13 Claims, 8 Drawing Sheets

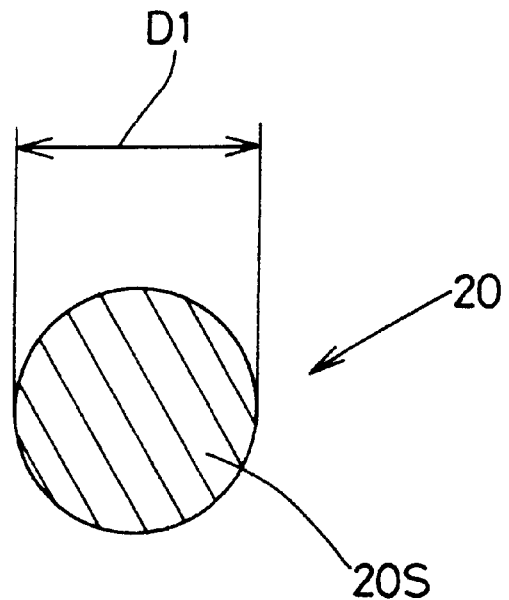
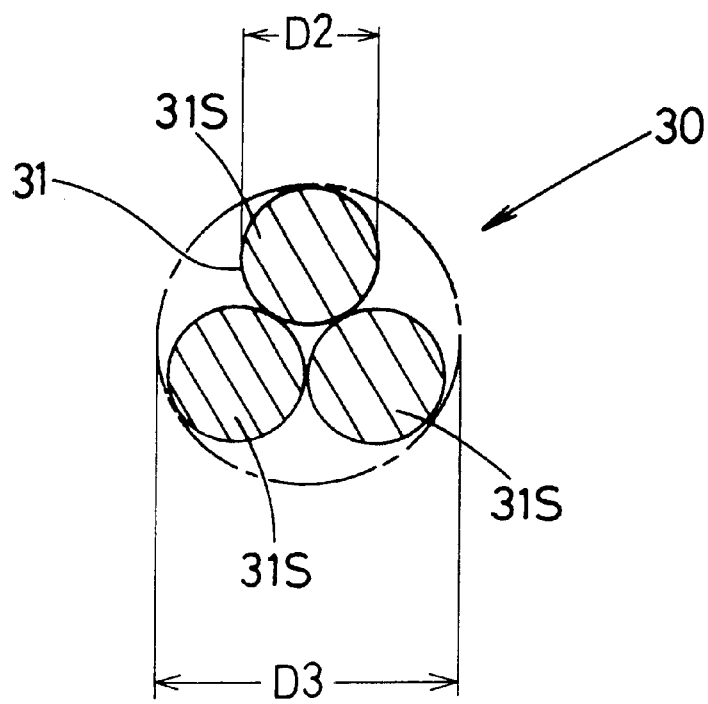

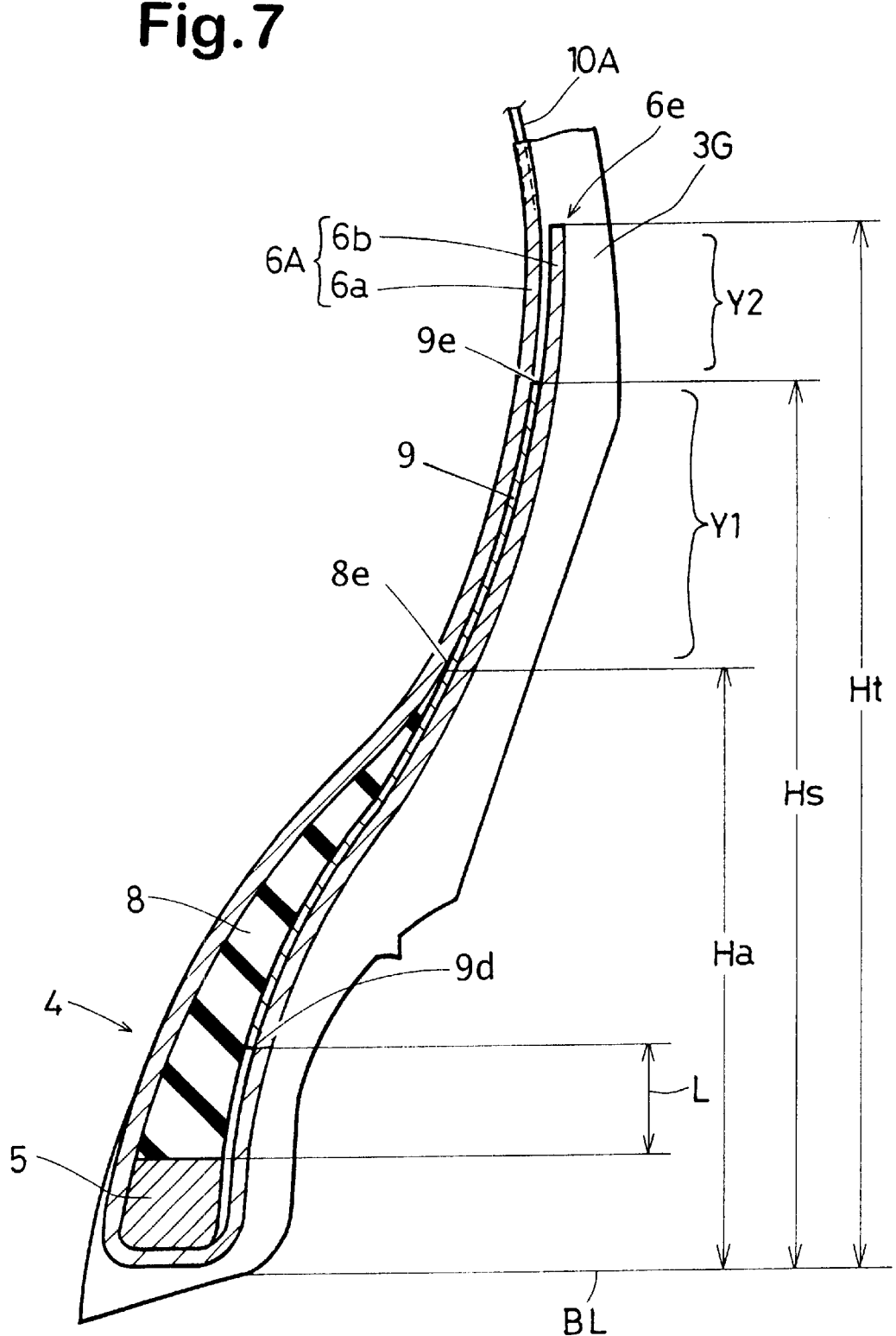

TUBELESS TIRE

The present invention relates to a pneumatic tire, in which an inner liner is eliminated to reduce the tire weight, whereas the steering stability, ride comfort, durability and the like can be improved.

In pneumatic tires used without a tube, the inside of the tire is covered with an inner liner made of air-impermeable butyl rubber compound disposed on the inside of a carcass.

The laid-open Japanese patent application Nos. JP-A-6-156007 and JP-A-8-113007 disclose tubeless tires, wherein a butyl rubber compound is used for a topping rubber of a carcass, and an inner liner is eliminated to reduce the tire weight. As the butyl rubber is low in the impact resilience in comparison with diene rubber usually used as topping rubber, when the butil rubber is used as carcass topping rubber, the steering stability, ride comfort and the like are liable to deteriorate.

An object of the present invention is therefore to provide a tubeless tire, in which a butil rubber compound is used as carcass topping rubber, whereas the steering stability and ride comfort can be improved.

Further, when the butyl rubber is used as carcass topping rubber, a separation failure is liable to occur at the carcass ply turnup end if a stress concentration occurs.

Another object of the present invention is to provide a tubeless tire, in which a butil rubber compound is used as carcass topping rubber, whereas a separation failure is prevented to improve the durability.

According to the present invention, a pneumatic tire comprises
- a tread portion,
- a pair of sidewall portions,
- a pair of bead portions with a bead core therein,
- a carcass ply extending between the bead portions and including a topping rubber layer,
- the topping rubber layer facing the inside of the tire and made of a butyl rubber compound containing at least 10 parts by weight of butyl rubber or butyl rubber derivative,
- a thickness of the butyl rubber compound measured between the inner surface of the tire and adjacent cords of the carcass ply being in the range of 0.2 to 1.0 mm,
- a belt disposed radially outside the carcass in the tread portion,
- the belt comprising at least one ply of monofilament cords laid at an angle of from 10 to 40 degrees with respect to the circumferential direction of the tire, and
- each of the monofilament cords consisting of a single filament.

Preferably, the carcass ply is turned up around the bead core in each bead portion so as to form a pair of turnup portions and a main portion therebetween, and a bead apex made of hard rubber is disposed between the turnup portion and main portion. The height of the bead apex is decreased into the range of 10 to 20 mm, and the turnup portion adjoins the main portion above the bead apex.

Embodiments of the present invention will now be described in detail in conjunction with the accompanying drawings.

FIG. 1 is a cross sectional view of an embodiment of the present invention.

FIGS. 2(A)–(B) are cross sectional views of a monofilament cord and a multifilament cord, respectively.

FIGS. 3(A)–3(C) are schematic sectional views for explaining the thickness of carcass ply topping rubber.

FIG. 7 is a cross sectional view of still another embodiment of the present invention include an auxiliary cord layer.

Figure 8A:
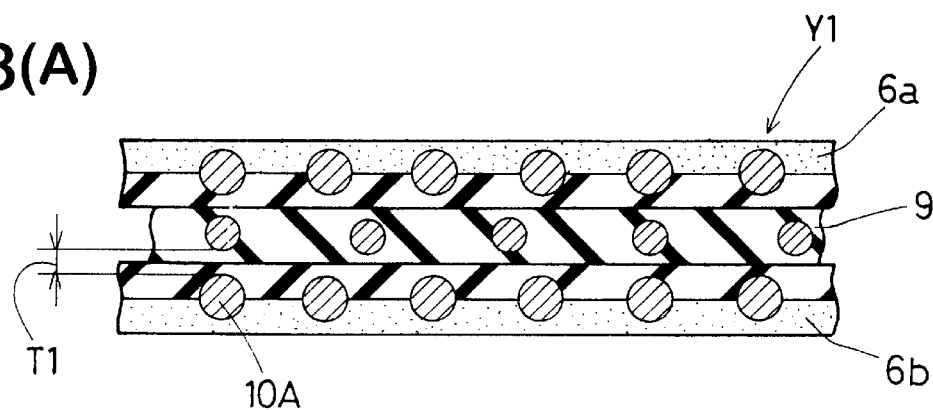
Figure 8B:
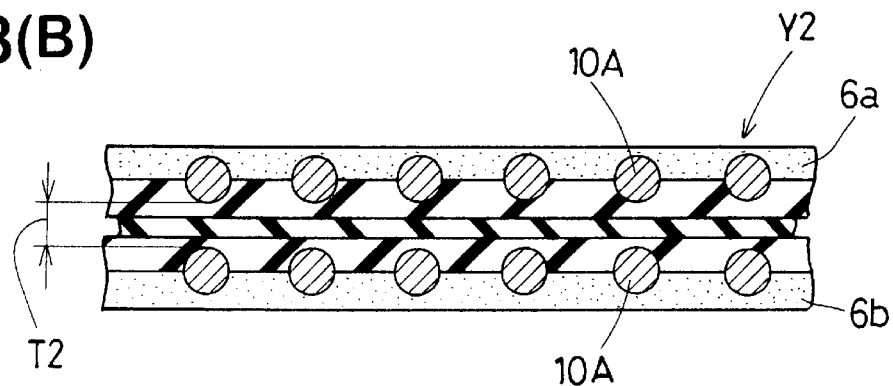

FIGS. 8(A)–8(B) are partial sectional views of the carcass.

Figure 9:
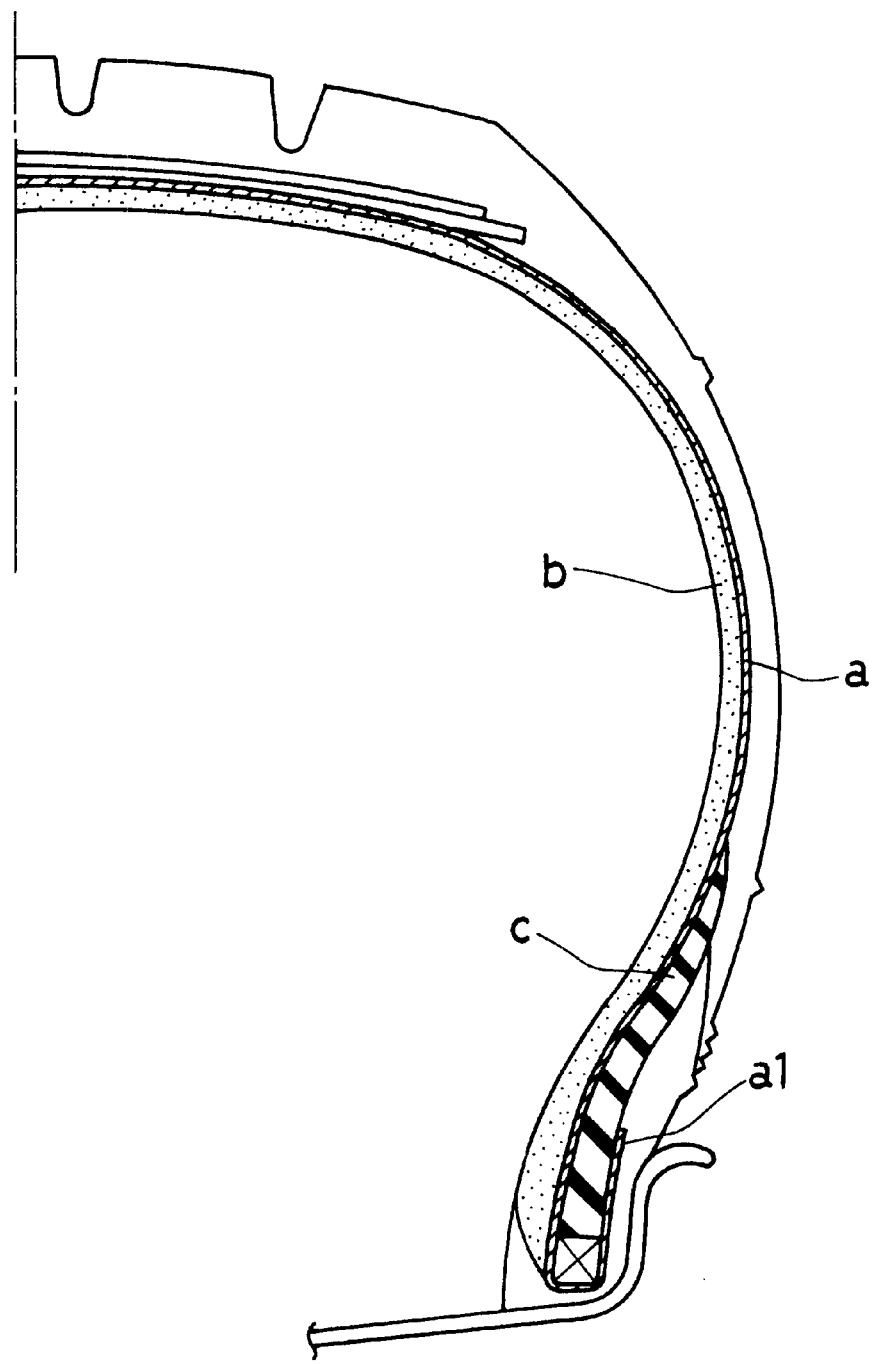

FIG. 9 is a cross sectional view of a prior art tire.

In the drawings, pneumatic tires 1 according to the present invention each comprises a tread portion 2, a pair of sidewall portions 3, a pair of axially spaced bead portions 4 with a bead core 5 therein, a carcass 6 extending between the bead portions 4 through the tread portion 2 and sidewall portions 3, a belt 7 disposed radially outside the carcass 6 in the tread portion 2, and a bead apex 8 made of hard rubber disposed in each of the bead portions 4.

In this invention, a conventional inner liner disposed along the inside of a carcass is not provided.

All the illustrated tires are a radial ply tire for passenger cars.

If not specifically mentioned, various sizes or dimensions concerning a tire are measured under a normally inflated condition in which the tire is mounted on a standard rim and inflated to a standard pressure but loaded with no tire load. Here, the standard rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at Various Cold Inflation Pressures" table in TRA or the like. The standard load is the "maximum load capacity" in JATMA, the "Load Capacity" in ETRTO, the maximum value given in the above-mentioned table in TRA or the like. The bead base line BL referred hereinafter is an axial line passing at a radial height corresponding to the rim diameter of the standard rim.

The above-mentioned carcass 6 comprises at least one ply 6A of cords 10A arranged radially at an angle of from 75 to 90 degrees with respect to the tire equator C, and extending between the bead portions 4 through the tread portion 2 and sidewall portions 3, and turned up around the bead core 5 in each bead portion 4 from the axially inside to the outside of the tire so as to form a pair of turnup portions 6b and a main portion 6a therebetween.

For the carcass cords 10A, organic fiber cords, e.g. polyester, nylon, rayon, aromatic polyamide, Vinylon and the like are suitably used in case of passenger car tires.

An innermost carcass ply which is the above-mentioned ply 6A in the illustrated examples is rubberized by an inside topping layer 11$i$ and an outside topping layer 11$o$.

The inside topping layer 11$i$ is disposed on one side of the innermost carcass ply 6A to face the hollow of the tire between one of the bead portions 4 and the other, and the outside topping layer 11$o$ is disposed on the other side of the innermost carcass ply.

The inside topping layer 11$i$ is made of a butyl rubber compound containing at least 10 parts by weight, preferably at least 30 parts by weight of butyl rubber or butyl rubber derivative with respect of 100 parts by weight of base rubber. Here, the butyl rubber means a copolymer (IIR) of isobutylene and a small quantity of isoprene. The butyl rubber derivative is halogenated butyl rubber such as chlorinated butyl rubber and brominated butyl rubber. Usually, the butyl rubber compound further contains reinforcing agents such as carbon black, vulcanizing agent, vulcanization accelerator, softener and the like. Furthermore, the butyl rubber compound may contains diene rubber such as natural rubber (NR), butadiene rubber (BR), styrene-butadiene rubber (SBR) and the like as its base rubber.

The outside topping layer 11o is made of a non-butyl rubber compound containing at least 90 parts by weight, preferably 100 parts by weight of diene rubber with respect to 100 parts by weight of base rubber.

The following Table 1 shows an example A of the butyl rubber compound and an example B of the non-butyl rubber compound.

TABLE 1

| Rubber compound | (parts by weight) | |
| --- | --- | --- |
|  | A | B |
| Base rubber |  |  |
| Halogenated butyl | 30 | — |
| Natural rubber | 70 | 67 |
| Styrene butadiene rubber | — | 33 |
| Carbon black | 50 | 57 |
| Oil | — | 8.5 |
| Sulfur | 3 | 1.5 |
| Hydrozincite | 5 | 3 |
| Accelerator | 1 | 1 |
| Stearic acid | 2 | 1.5 |

In order to obtain a sufficient air sealing effect, the minimum thickness Ti of the inside topping rubber 11o measured from its surface to the carcass cords 10A is set in the range of 0.2 to 1.0 mm, preferably 0.3 to 0.8 mm. If the minimum thickness Ti is less than 0.2 mm, the necessary air tightness can not be obtained. If the minimum thickness Ti is more then 1.0 mm, it becomes difficult to compensate the deterioration of the steering stability and ride comfort, and the tire weight increases.

Figure 3A:
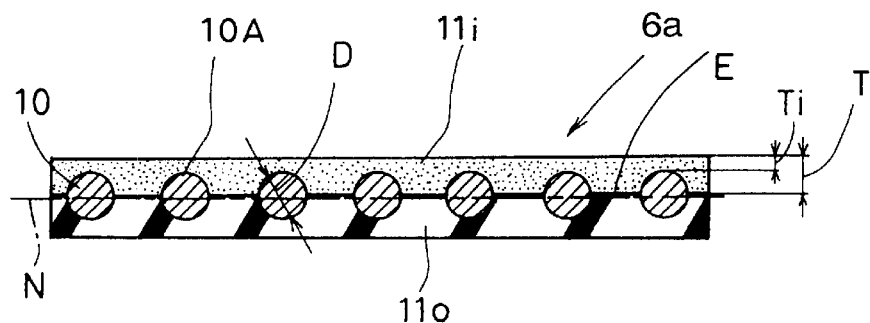
Figure 3B:
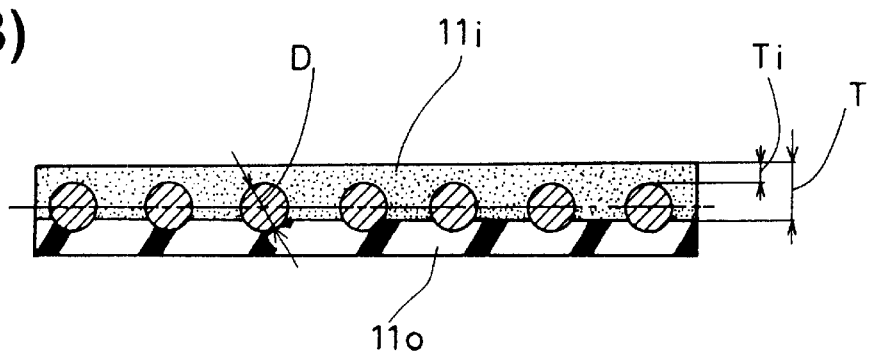
Figure 3C:
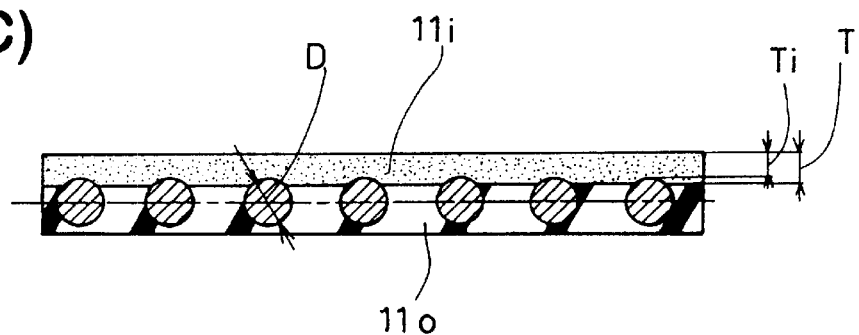

The boundary E between the inside topping layer 11i and the outside topping layer 11o may be positioned on a center line N linking the centers of the cords 10A as shown in FIG. 3(A) or outside the center line N as shown in FIG. 3(B) or inside the center line N as shown in FIG. 3(C). However, from a point of view of balance between the steering stability and ride comfort and the adhesiveness to the carcass cords, the maximum rubber thickness T of the inside topping layer measured from its surface to the boundary E is preferably not more than Ti+0.5D and not more than 1.5 mm. Foe example, the thickness T is 0.5 to 1.0 mm.

To define the above-mentioned tread portion 2, sidewall portions 3 and bead portions 4, a tread rubber 2G, sidewall rubber 3G and bead rubber (clinch rubber) 4G are disposed outside the carcass 6. For these materials, conventional rubber compounds which are not the above-mentioned butil rubber compound can be used.

The above-mentioned belt comprises a breaker 7 and optionally a band wound thereon.

The breaker 7 comprises at least one ply of monofilament cords 20 and optionally a ply of multifilament cords 30, wherein each ply extending across at least 80% of the tread width.

The monofilament cord 20 is composed of a single steel filament as shown in FIG. 2(A). The multifilament cord 30 is composed of at least three steel filaments 31 twisted together as shown in FIG. 2(B). These filaments 20 and 31 may be made of organic materials, e.g. nylon, rayon, polyester, aramid and the like.

Usually, the breaker 7 comprises two cross plies of parallel cords laid at an angle of 10 to 40 degrees with respect to the circumferential direction of the tire, and at least one of the two cross plies is the above-mentioned monofilament cord ply.

The diameter D1 of the monofilament cord 20 is preferably in the range of from 0.35 to 0.55 mm.

The multifilament cord 30 comprises three steel filaments 31 each having a diameter D2 in the range of from 0.20 to 0.40 mm. And the diameter D3 of the multifilament cord 30 is in the range of from 0.50 to 0.70 mm.

The sectional area 20S of the monofilament cord 20 is set in the range of from 0.68 to 0.88 times the total sectional area 31S of the steel filaments 31 of the multifilament cord 30.

For example, when the multifilament cord 30 has a 1×3/0.27 structure (total sectional area=0.1717 sq.mm), the sectional area 20S of the monofilament cord 20 is set in the range of from 0.117 to 0.151 sq.mm. Thus, the diameter D1 of the monofilament cord 20 is set in the range of from 0.39 to 0.44 mm (in this example 0.42 mm for 1×3/0.27).

The cord count N of the monofilament cord ply and the multifilament cord ply is in the range of from 33 to 47 (cords/5 cm).

The band (not shown) is disposed radially outside the breaker and composed of spiral windings of at least one cord or a strip of parallel cords. The cord angle is less than 10 degrees, usually substantially 0 degrees with respect to the circumferential direction of the tire.

The above-explained belt structure can be applied to not only passenger car tires but also motorcycle tires, light truck tires and the like.

Table 2 shows results of the following comparison tests, wherein test tires had the same structure except for the belt structure, carcass ply topping rubber and inner liner.

Air tightness test: The tire mounted on a standard rim and inflated to a normal pressure was put in a 80 deg. C hot chamber for 15 days. Then, the decreasing rate of the inner pressure was measured and the inverse number thereof is indicated by an index based on Prior art tire being 100. The larger the index, the better the air tightness.

Production efficiency test: The time required to make a raw tire was measured. The results are indicated by an index based on Prior art tire being 100. The smaller the index, the better the production efficiency.

Steering stability and Ride comfort test: A test car provided on all the four wheels with test tires was run on test course, and steering stability (steering response, rigidity, grip, transient side force, linearity, critical cornering speed) was evaluated into ten ranks by the driver's feeling. The higher the rank, the better the steering stability. Further, the test car was run on a bumpy road, stone-paved road and graveled road in a tire test course and ride comfort (harshness, pushing-up, damping) was evaluated into ten ranks by the driver's feeling. The higher the rank, the better the ride comfort.

Tire weight: The weight of the tire is indicated by an index based on Prior art tire being 100. The smaller the index, the lighter the weight.

TABLE 2

| Tire | Ex. A1 | Ex. A2 | Ex. A3 | Ref. A1 | Ref. A2 | Ref. A3 | Prior |
|---|---|---|---|---|---|---|---|
| Inner liner | none | none | none | none | present | present | present |
| Carcass | 1 ply | 1 ply | 1 ply | 1 ply | 1 ply | 1 ply | 1 ply |
| Cord angle (deg.) | 90 | 90 | 90 | 90 | 90 | 90 | 90 |
| Cord | polyester 1100 dtex/2 | polyester 1100 dtex/2 | polyester 1100 dtex/2 | polyester 1100 dtex/2 | polyester 1100 dtex/2 | polyester 1100 dtex/2 | polyester 1100 dtex/2 |
| Cord count (/5 cm) | 61 | 61 | 61 | 61 | 61 | 61 | 61 |
| Topping Rubber | | | | | | | |
| Inside | A | A | A | A | B | B | B |
| Outside | B | B | B | B | B | B | B |
| Thickness Ti (mm) | 0.3 | 0.3 | 0.3 | 0.3 | 0.3 | 0.3 | 0.3 |
| Belt * | 2 plies | 2 plies | 2 plies | 2 plies | 2 plies | 2 plies | 2 plies |
| Inner ply | multi | mono | mono | multi | mono | mono | multi |
| Cord | steel 1 × 3/0.27 | steel 1 × 1/0.42 | steel 1 × 1/0.42 | steel 1 × 3/0.27 | steel 1 × 1/0.42 | steel 1 × 1/0.42 | steel 1 × 3/0.27 |
| Cord count (/5 cm) | 40 | 40 | 40 | 40 | 40 | 40 | 40 |
| Outer ply | mono | multi | mono | multi | mono | mono | multi |
| Cord | steel 1 × 1/0.42 | steel 1 × 3/0.27 | steel 1 × 1/0.42 | steel 1 × 3/0.27 | steel 1 × 1/0.42 | steel 1 × 1/0.42 | steel 1 × 3/0.27 |
| Cord count (/5 cm) | 40 | 40 | 40 | 40 | 40 | 40 | 40 |
| Tire weight | 92 | 92 | 91 | 93 | 98 | 98 | 100 |
| Air tightness | 100 | 100 | 100 | 100 | 100 | 100 | 100 |
| Production efficiency | 90 | 90 | 90 | 90 | 100 | 100 | 100 |
| Steering stability | 7 | 6.5 | 6.5 | 5 | 7 | 7 | 6 |
| Ride comfort | 6.5 | 7 | 6.5 | 7 | 5 | 5 | 6 |

Note:
Belt cord angles are plus/minus 24 degrees with respect to the tire equator.
Tire size: 195/65R14,
Rim size: 6JJX14 (standard rim),
Tire pressure: 200 kpa (normal)
Test car: 2000cc FF passenger car Based on the above-explained basic structure, various modifications can be made as follows.

Small Bead Apex

Figure 1:
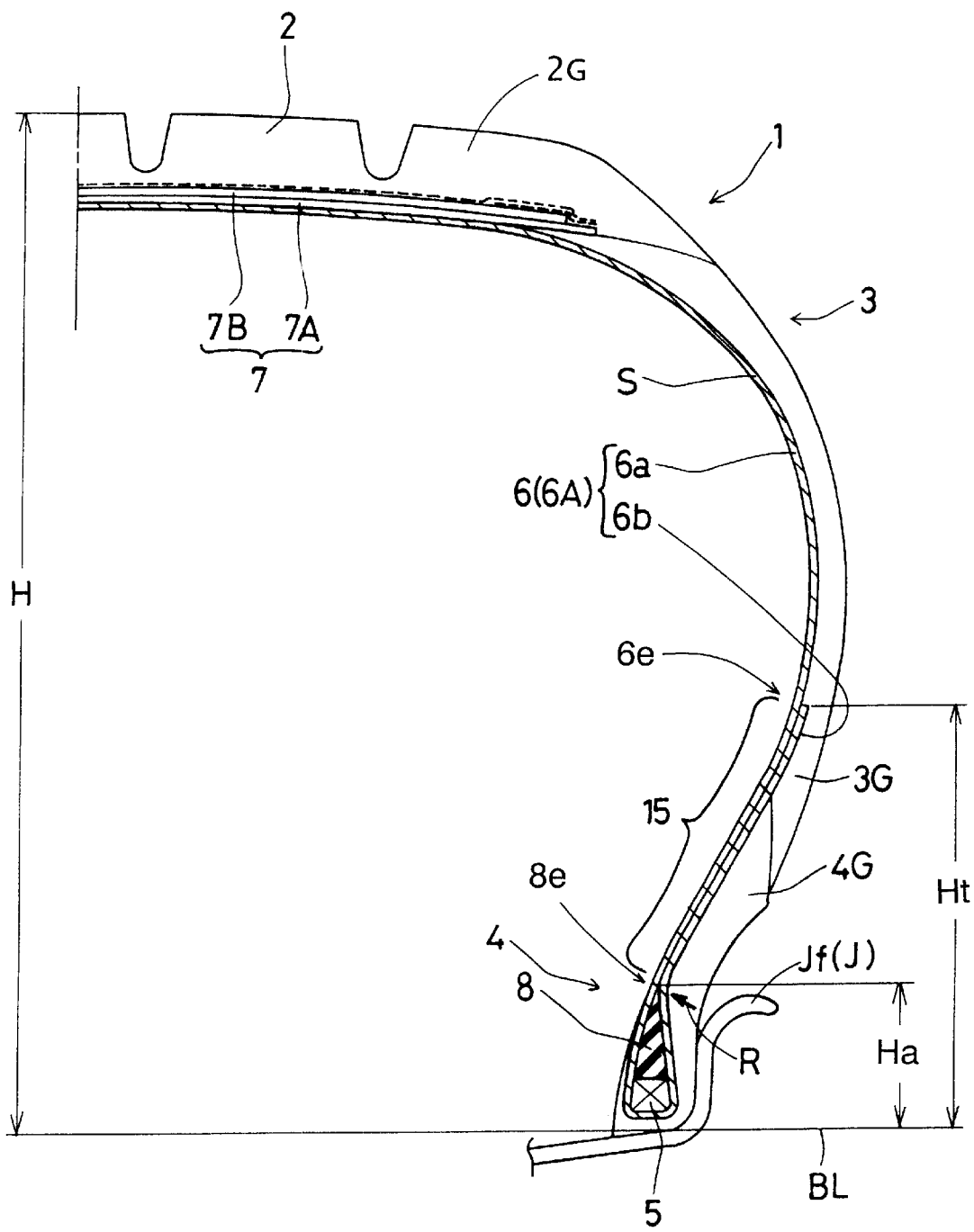

In order to reduce the tire weight, it is possible to reduce the volume of the above-mentioned bead apex 8 as shown in FIG. 1. This structure can be applied to not only passenger car tires but also motorcycle tires, light-truck tires and the like. In this case, it is effective to remarkably reduce the bead apex height Ha in comparison with usual height, and the height Ha is roughly the same as that of the flange Jf of the standard wheelrim J. The height Ha is in the range of from 10 to 20 mm, preferably 13 to 17 mm from the bead base line BL.

The bead apex 8 is made of relatively hard rubber having a JIS-A hardness of from 65 to 95 degrees, preferably 70 to 90 degrees, and tapers radially outwardly from the bead core.

Further, the height Ht of the carcass ply turnup portion 6b must be more than the height Ha of the bead apex 8 so as to form an adjoining part 15 in which the carcass ply turnup portion 6b and main portion 6a adjoin each other. This structure helps to improve the steering stability and ride comfort.

The height Hb of the radially outer end 6e of the turnup portion 6b is set in the range of from 0.3 to 0.7 times, preferably 0.40 to 0.55 times the tire section height H, each from the bead base line BL.

Near the outer end 8e of the bead apex 8, the turnup portion 6b is curved concavely along the axially outside of the bead apex, and the radius R of curvature is in the range of from 5 to 15 mm, preferably 8 to 12 mm, whereby a separation due to residual air can be prevented.

Figure 4:
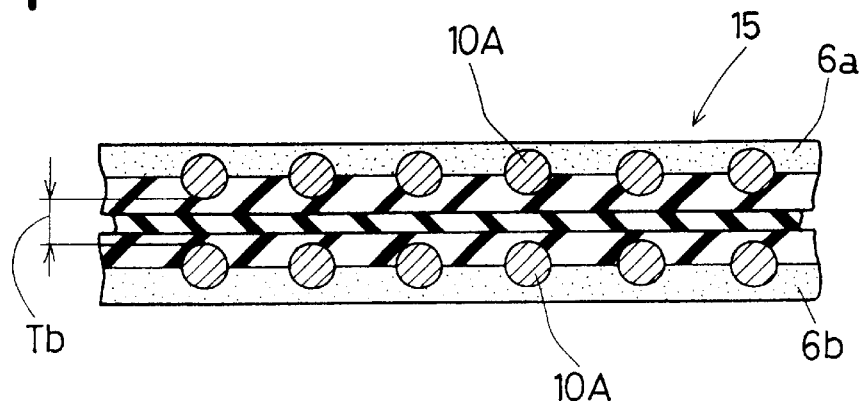
FIG. 4 is a partial sectional view of a part of the carcass in which a turnup portion and main portion of the carcass ply adjoin each other.

In the adjoining part 15, as shown in FIG. 4, the rubber thickness Tb between the cords in the turnup portion 6b and the adjacent cords in the main portion 6a is in the range of from 0.3 to 0.8 mm.

If the thickness Tb is less than 0.3 mm, a ply separation failure is liable to occur. If the thickness Tb is more than 0.8 mm, the tire weight increases.

If the bead apex height Ha is less than 10 mm, it is difficult to make such a structure. If the bead apex height Ha is more than 20 mm, the stress in the turnup portion 6b increases and a separation therefrom is liable to occur.

If the height Ht is less than 0.3 times the height H, the lateral stiffness becomes insufficient, and the steering stability greatly deteriorates. If the height Ht is more than 0.7 times the height H, ride comfort is lowered.

Table 3 shows results of comparison tests, wherein test tires had the same structure except for the bead apex, carcass ply topping rubber and inner liner.

TABLE 3

| Tire | Ex.B1 | Ex.B2 | Ref.B1 | Prior |
|---|---|---|---|---|
| Inner liner | none | none | present | present |
| Carcass | 1 ply | 1 ply | 1 ply | 1 ply |
| Cord | 1100 dtex/2 | 1100 dtex/2 | 1100 dtex/2 | 1100 dtex/2 |
| Cord count/5 cm | 61 | 61 | 61 | 61 |
| Topping rubber | | | | |
| Inside | A | A | B | B |
| Outside | B | B | B | B |
| Thickness Ta (mm) | 0.3 | 0.3 | — | — |
| Thickness Tb (mm) | 0.6 | 0.6 | 0.4 | 0.4 |
| Turnup height hb (mm) | 61 (0.5 H) | 61 (0.5 H) | 61 (0.5 H) | 61 (0.5 H) |
| Radius of curvature R (mm) | 10 | 75 | 10 | 75 |
| Tire section height H (mm) | 122.5 | 122.5 | 122.5 | 122.5 |

TABLE 3-continued

| Tire | Ex.B1 | Ex.B2 | Ref.B1 | Prior |
|---|---|---|---|---|
| Bead apex height ha (mm) | 15 | 40 | 15 | 40 |
| Tire weight | 90 | 93 | 97 | 100 |
| Air tightness | 100 | 100 | 100 | 100 |
| Production efficiency | 85 | 90 | 95 | 100 |
| Steering stability | 6 | 7 | 5 | 6 |
| Ride comfort | 6.5 | 5.5 | 7 | 6 |

Figure 5:
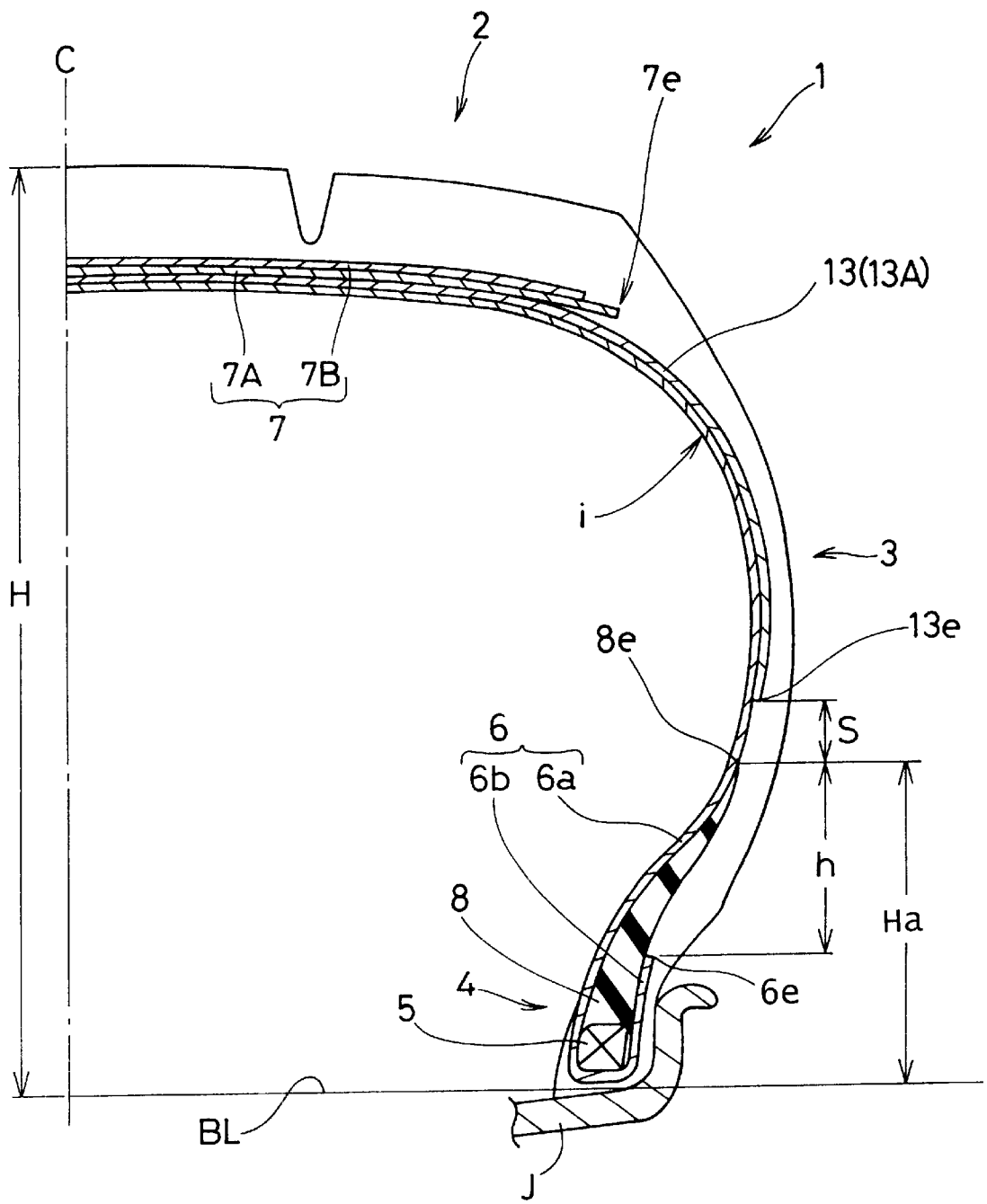
FIG. 5 is a cross sectional view of another embodiment of the present invention include an auxiliary cord layer.
Figure 6:
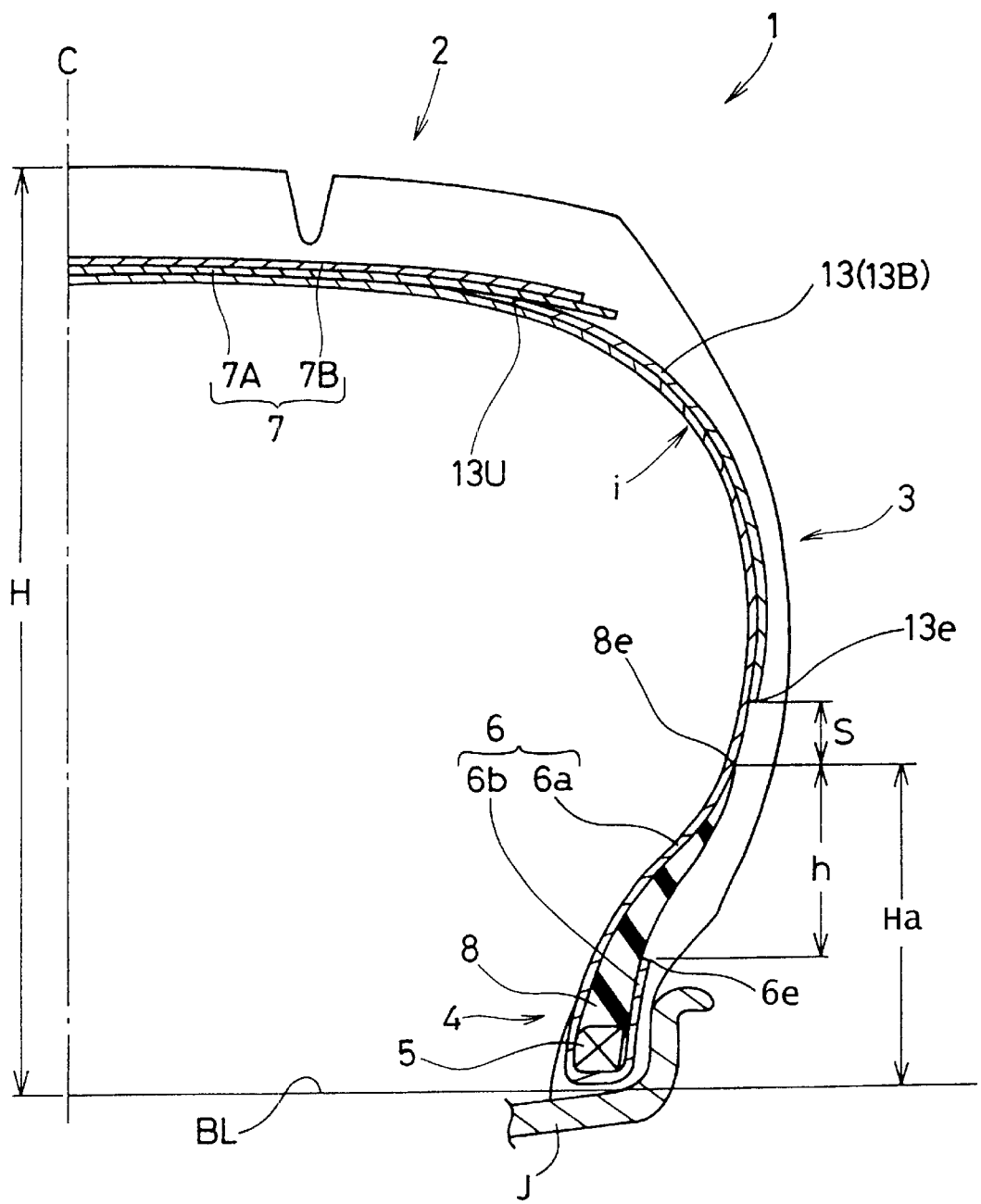
FIG. 6 is a cross sectional view showing a modification of the auxiliary cord layer thereof.

Tire size: 175170R13,
Rim size: 5JJX13 (standard rim)
Test car: 1600 cc FF passenger car Auxiliary Cord Layer in Upper Sidewall FIGS. 5 and 6 show other modifications, wherein the carcass 6 is composed of the single ply 6A, an auxiliary cord layer 13 is disposed outside the carcass 6, and the height of the carcass ply turnup portion 6b is decreased, but the height of the bead apex 8 is again increased. This structure may be applied to motorcycle tires, light truck tires and the like in addition to passenger car tires.

The bead apex 8 is made of hard rubber having a JIS-A hardness of from 65 to 95 degrees, preferably 70 to 90 degrees. The height Ha of the radially outer end 8e of the bead apex 8 is 0.15 to 0.55 times, preferably 0.15 to 0.30 times the tire section height H.

The radially outer end 6e of the turnup portion 6b is positioned radially inward of the radially outer end 8e of the bead apex 8, and the radial distance h between the ends 6e and 8e is at least 5 mm, preferably not less than 10 mm, more preferably in the range of from 10 to 25 mm.

The bead apex rubber 8 is relatively hard and relatively thick in the lower part. Therefore, its bending deformation is relatively small. Thus, by disposing the turnup end 6e beside the bead apex 8, a separation failure can be prevented and the durability is improved.

The auxiliary cord layer 13 is composed of a single ply of radially arranged cords, and both sides thereof are rubberized with the above-mentioned non-butyl rubber compound.

The auxiliary cord layer 13 has a radially inner end 13e in each of the sidewall portions 3. The radially inner ends 13e is located at a position radially outwardly spaced apart from the radially outer end 8e of the bead apex, and the radial distance S therebetween is in the range of from 10 to 15 mm. The auxiliary cord layer 13 extends from each of the radially inner ends 13e to a position beneath the belt 7 at least. If not, the steering stability deteriorates. When the carcass cord angle is 90 degrees with respect to the tire equator, the cord angle of the auxiliary cord layer is also set at 90 degrees. When the carcass cord angle is not 90 degrees, the cords of the auxiliary cord layer are arranged at an angle numerically same as or similar to the carcass cord angle so as to cross the carcass cords. Preferably, the auxiliary cord layer 13 is the same as the carcass ply in respect of the material, sizes and construction of the cord and the cord count in the ply.

FIG. 5 shows an example of the auxiliary cord layer 13 which extends continuously from one of the sidewall portions 3 to the other. In this case, the steering stability may be further improved.

FIG. 6 shows another example of the auxiliary cord layer 13 which breaks under the belt 7, thus it is made up of two axially spaced parts 13B. In this case, the tire weight further decreases.

Table 4 shows results of comparison tests, wherein test tires had the same structure except for the bead apex, carcass ply topping rubber and inner liner.

TABLE 4

| Tire | Ex. C1 | Ex. C2 | Ex. C3 | Ex. C4 | Prior | Prior 2 |
|---|---|---|---|---|---|---|
| Inner liner | none | none | none | none | present | present |
| Carcass | 1 ply | 1 ply | 1 ply | 1 ply | 1 ply | 2 plies |
| Topping rubber | | | | | | |
| Inside | A | A | A | A | B | B |
| Outside | B | B | B | B | B | B |
| Turnup end position * | inside | inside | outside | inside | outside | outside |
| Auxiliary ply | FIG. 5 | FIG. 6 | none | none | none | none |
| Tire weight | 86 | 83 | 83 | 80 | 90 | 100 |
| Air tightness | 100 | 100 | 98 | 98 | 98 | 100 |
| Production efficiency | 88 | 100 | 77 | 77 | 88 | 100 |
| Steering stability | 6 | 5.5 | 5 | 4 | 5 | 6 |
| Ride comfort | 6.5 | 6.5 | 6.5 | 7 | 6.5 | 6 |

Note:
radially "outside" or "inside" of the radially outer end of the bead apex
Tire size: 195/65R14,
Rim size: 6JJX14 (standard rim)
Inner pressure: 200 kPa (normal),
Test car: 2000cc FF passenger car
* Auxiliary Cord Layer in Lower Sidewall FIG. 7 shows a further modification, wherein the carcass 6 is composed of the single ply 6A, and an auxiliary cord layer 9 is disposed between the carcass ply turnup portion 6b and the bead apex 8. This structure may be applied to motorcycle tires, light truck tires and the like in addition to passenger car tires.

The bead apex 8 has a JIS-A hardness of from 65 to 95 degrees, more preferably 70 to 90 degrees.

The auxiliary cord layer 9 is made of cords laid at an angle of 10 to 60 degrees (in this example 10 to 30 degrees) with respect to the circumferential direction of the tire, and both sides thereof are rubberized with the above-mentioned non-butyl rubber. For such cords, steel cords and high modulus organic cords such as aromatic polyamide and the like are preferably used.

The radially inner end 9d of the auxiliary cord layer 9 is preferably positioned at a distance L of not more than 7 mm from the radially outside of the bead core 5.

The height Hs of the auxiliary cord layer 9 is more than the height Ha of the bead apex 8, but less than the height Ht of the carcass ply turnup portion 6b. The height Ha is set in the range of from 0.20 to 0.40 times the tire section height H. The height Hs is set in the range of from 0.30 to 0.50 times the tire section height H. The height Ht is set in the range of from 0.40 to 0.60 times the tire section height H. And preferably, the difference (Hs-Ha) is not less than 10 mm and the difference (Ht-Hs) is not less than 5 mm. If not, due to stress concentration, durability is liable to deteriorate. It is especially preferable that the difference (Hs-Ha) and the difference (Ht-Hs) are the substantially same value of 0.1 to 0.15 times the tire section height H. Here, each height was measured radially from the bead base line BL.

As shown in FIG. 8(A), in a first region Y1 between the outer ends 8e and 9e of the bead apex 8 and auxiliary cord layer 9, respectively, the rubber thickness Ti between the cords in the auxiliary cord layer 9 and the adjacent carcass cords 10A in the turnup portion 6b is set in the range of from 0.2 to 0.5 mm.

As shown in FIG. 8(B), in a second region Y2 between the outer ends 9e and 6e of the auxiliary cord layer 9 and carcass ply turnup portion 6b, respectively, the rubber thickness T2 between the carcass cords 10A in the turnup portion 6b and the carcass cords 10A in the carcass main portion 6a is set in the range of from 0.3 to 0.8 mm.

Table 5 shows results of comparison tests, wherein test tires had the same structure except for the auxiliary cord layer, carcass ply topping rubber and inner liner.

TABLE 5

| Tire | Ex. D1 | Ex. D2 | Ref. D1 | Prior |
|---|---|---|---|---|
| Inner liner | none | none | present | present |
| Carcass | 1 ply | 1 ply | 1 ply | 1 ply |
| Cord | polyester 1100 dtex/2 | polyester 1100 dtex/2 | polyester 1100 dtex/2 | polyester 1100 dtex/2 |
| Cord count/5 cm | 60 | 60 | 60 | 60 |
| Toping rubber | | | | |
| Inside | A | A | B | B |
| Outside | B | B | B | B |
| Thickness Ti (mm) | 0.3 | 0.3 | — | — |
| Bead reinforcing cord | present | none | present | none |
| Cord | steel (1 × 3 × 0.27) | — | steel (1 × 3 × 0.27) | — |
| Cord angle (deg.) | 21 | — | 21 | — |
| Cord count/5 cm | 40 | — | 40 | — |
| Height Ha (mm) | 30 | 30 | 30 | 30 |
| Height Hs (mm) | 55 | — | 55 | — |
| Height Ht (mm) | 70 | 70 | 70 | 70 |
| Height H0 (mm) | 127 | 127 | 127 | 127 |
| Thickness T1 (mm) | 0.4 | — | 0.4 | — |
| Thickness T2 (mm) | 0.6 | | 0.6 | |
| Tire weight | 97 | 93 | 104 | 100 |
| Air tightness | 100 | 100 | 100 | 100 |
| Production efficiency | 93 | 90 | 103 | 100 |
| Steering stability | 7 | 5.5 | 7.5 | 6 |
| Ride comfort | 6 | 6.5 | 5.5 | 6 |

Tire size: 195/65R14,
Wheelrim size: 6JJX14 (standard rim)
Inner pressure: 200 kPa (normal),
Test car: 2000cc FF passenger car As described above, in the tubeless tires according to the present invention, to remove a conventional inner liner, the topping rubber layer on one side of the innermost carcass ply is made of a butyl rubber compound having a specific thickness, and at least one of the belt plies is made of monofilament cords. Therefore, the steering stability, ride comfort and the like can be improved. Further, by employing the small bead apex and providing the carcass ply adjoining part, the tire weight can be further decreased and a decrease in the durability due to carcass ply separation can be prevented.

What is claimed is:

1. A pneumatic tire comprising
   a tread portion,
   a pair of sidewall portions,
   a pair of bead portions with a bead core therein,
   a carcass ply extending between the bead portions and including a topping rubber layer, said carcass ply turned up around the bead core in each said bead portion to form a pair of turnup portions and a main portion therebetween,
   said topping rubber layer facing the inside of the tire and made of a butyl rubber compound containing at least 10 parts by weight of butyl rubber or butyl rubber derivative, a thickness of the butyl rubber compound measured between the inner surface of the tire and adjacent cords of the carcass ply being in a range of 0.2 to 1.0 mm,
   a belt disposed radially outside the carcass in the tread portion, said belt comprising at least one ply of monofilament cords laid at an angle of from 10 to 40 degrees with respect to the circumferential direction of the tire, each said monofilament cord consisting of a single filament,
   each said bead portion provided between the turnup portion and main portion with a bead apex extending radially outwardly from the bead core,
   an auxiliary cord layer disposed outside the carcass ply and rubberized with a non-butyl topping rubber compound, said auxiliary cord layer having, in each said sidewall portion, a radially inner end 13e spaced radially outwardly apart from the radially outer end 8e of the bead apex by a distance of 10 to 15 mm, said auxiliary cord layer extending radially outwardly from each said radially inner end 13e to a position beneath the belt at least,
   a radial height of the radially outer end 8e of the bead apex being in a range of from 0.15 to 0.55 times the tire section height, the radially outer end 6e of the turnup portion positioned radially inward of the radially outer end 8e of the bead apex, and
   the radial distance between the radially outer end 8e of the bead apex and the radially outer end 6e of the turned up portion being not less than 5 mm.

2. The pneumatic tire according to claim 1, wherein said at least one ply of monofilament cords is two plies of monofilament cords.

3. The pneumatic tire according to claim 1, wherein said belt further comprises one ply of multifilament cords laid at an angle of from 10 to 40 degrees with respect to the circumferential direction of the tire.

4. A pneumatic tire comprising a tread portion, a pair of sidewall portions, a pair of bead portions with a bead core therein, a carcass ply extending between the bead portions and including a topping rubber layer, said carcass ply turned up around the bead core in each said bead portion to form a pair of turnup portions and a main portion therebetween, said topping rubber layer facing the inside of the tire and made of a butyl rubber compound containing at least 10 parts by weight of butyl rubber or butyl rubber derivative, a thickness of the butyl rubber compound measured between the inner surface of the tire and adjacent cords of the carcass ply being in a range of 0.2 to 1.0 mm, a belt disposed radially outside the carcass in the tread portion, said belt comprising at least one ply of monofilament cords laid at an angle of from 10 to 40 degrees with respect to the circumferential direction of the tire, each said monofilament cord consisting of a single filament, each said bead portion provided between the turnup portion and main portion with a bead apex extending radially outwardly from the bead core, an auxiliary cord layer disposed outside the carcass ply and rubberized with a non-butyl topping rubber compound, said auxiliary cord layer having, in each said sidewall portion, a radially inner end 13e spaced radially outwardly apart from the radially outer end 8e of the bead apex by a distance of 10 to 15 mm, said auxiliary cord layer extending radially outwardly from each said radially inner end 13e to a position beneath the belt at least, a radial height of the radially outer end 8e of the bead apex being in a range of from 0.15 to 0.55 times the tire section height, the radial distance between the radially outer end 8e of the bead apex and the radially outer end 6e of the turned up portion being not less than 5 mm, wherein the auxiliary cord layer extends continuously between the radially inner ends thereof.

5. A pneumatic tire comprising a tread portion, a pair of sidewall portions, a pair of bead portions with a bead core therein, a carcass ply extending between the bead portions and including a topping rubber layer, said carcass ply turned up around the bead core in each said bead portion to form a pair of turnup portions and a main portion therebetween, said topping rubber layer facing the inside of the tire and made of a butyl rubber compound containing at least 10, parts by weight of butyl rubber or butyl rubber derivative, a thickness of the butyl rubber compound measured between the inner surface of the tire and adjacent cords of the carcass ply being in a range of 0.2 to 1.0 mm, a belt disposed radially outside the carcass in the tread portion, said belt comprising at least one ply of monofilament cords laid at an angle of from 10 to 40 degrees with respect to the circumferential direction of the tire, each said monofilament cord consisting of a single filament, each said bead portion provided between the turnup portion and main portion with a bead apex extending radially outwardly from the bead core, and the radially outer end 6e of the turnup portion positioned radially inward of the radially outer end 8e of the bead apex, an auxiliary cord layer disposed outside the carcass ply and rubberized with a non-butyl topping rubber compound, said auxiliary cord layer having, in each said sidewall portion, a radially inner end 13e spaced radially outwardly apart from the radially outer end 8e of the bead apex by a distance of 10 to 15 mm, said auxiliary cord layer extending radially outwardly from each said radially inner end 13e to a position beneath the belt so that the auxiliary cord layer breaks in the tread portion beneath the belt.

6. The pneumatic tire according to claim 5, wherein said at least one ply of monofilament cords is two plies of monofilament cords.

7. The pneumatic tire according to claim 5, wherein said belt further comprises one ply of multifilament cords laid at an angle of from 10 to 40 degrees with respect to the circumferential direction of the tire.

8. A pneumatic tire according to claim 5, wherein the radial distance between the radially outer end 6e of the turnup portion and the radially outer end 8e of the bead apex is at least 5 mm.

9. A pneumatic tire according to claim 5, wherein the radial distance between the radially outer end 6e of the turnup portion and the radially outer end 8e of the bead apex is in a range of from 10 to 25 mm.

10. A pneumatic tire comprising a tread portion, a pair of sidewall portions, a pair of bead portions with a bead core therein, a carcass ply extending between the bead portions and including a topping rubber layer, said carcass ply turned up around the bead core in each said bead portion to form a pair of turnup portions and a main portion therebetween, said topping rubber layer facing the inside of the tire and made of a butyl rubber compound containing at least 10 parts by weight of butyl rubber or butyl rubber derivative, a thickness of the butyl rubber compound measured between the inner surface of the tire and adjacent cords of the carcass ply being in the range of 0.2 to 1.0 mm, a belt disposed radially outside the carcass in the tread portion, said belt comprising at least one ply of monofilament cords laid at an angle of from 10 to 40 degrees with respect to the circumferential direction of the tire, each said monofilament cord consisting of a single filament, each said bead portion provided between the turnup portion and main portion with a bead apex extending radially outwardly from the bead core, an auxiliary cord layer disposed between the bead apex and turnup portion in each said bead portion, a radial height Hs of the radially outer end 9e of the auxiliary cord layer being more than a radial height Ha of the radially outer end 8e of the bead apex, but less than a radial height Ht of the radially outer end 6e of the turnup portion, in a first region between the end 8e and end 9e, the thickness of rubber between the cords in the turnup portion and the cords in the auxiliary cord layer being in a range of from 0.2 to 0.5 mm, in a second region between the end 9e and end 6e, the thickness of rubber between the cords in the main portion and the cords in the turnup portion being in a range of from 0.3 to 0.8 mm, the height Ht of the turnup portion being in a range of from 0.4 to 0.60 times the tire section height, the height Hs of the auxiliary cord layer being in a range of from 0.3 to 0.50 times the tire section height, the height Ha of the bead apex being in a range of from 0.20 to 0.40 times the tire section height, the difference (Hs-Ha) between the height Ha and height Hs being not less than 10 mm, the difference (Ht-Hs) between the height Hs and height Ht being not less than 5 mm.

11. The pneumatic tire according to claim 10, wherein the difference (Hs-Ha) and difference (Ht-Hs) are the substantially same values of 0.1 to 0.15 times the tire section height.

12. The pneumatic tire according to claim 10, wherein said at least one ply of monofilament cords is two plies of monofilament cords.

13. The pneumatic tire according to claim 10, wherein said belt further comprises one ply of multifilament cords laid at an angle of from 10 to 40 degrees with respect to the circumferential direction of the tire.

* * * * *